United States Patent Office 3,455,332
Patented July 15, 1969

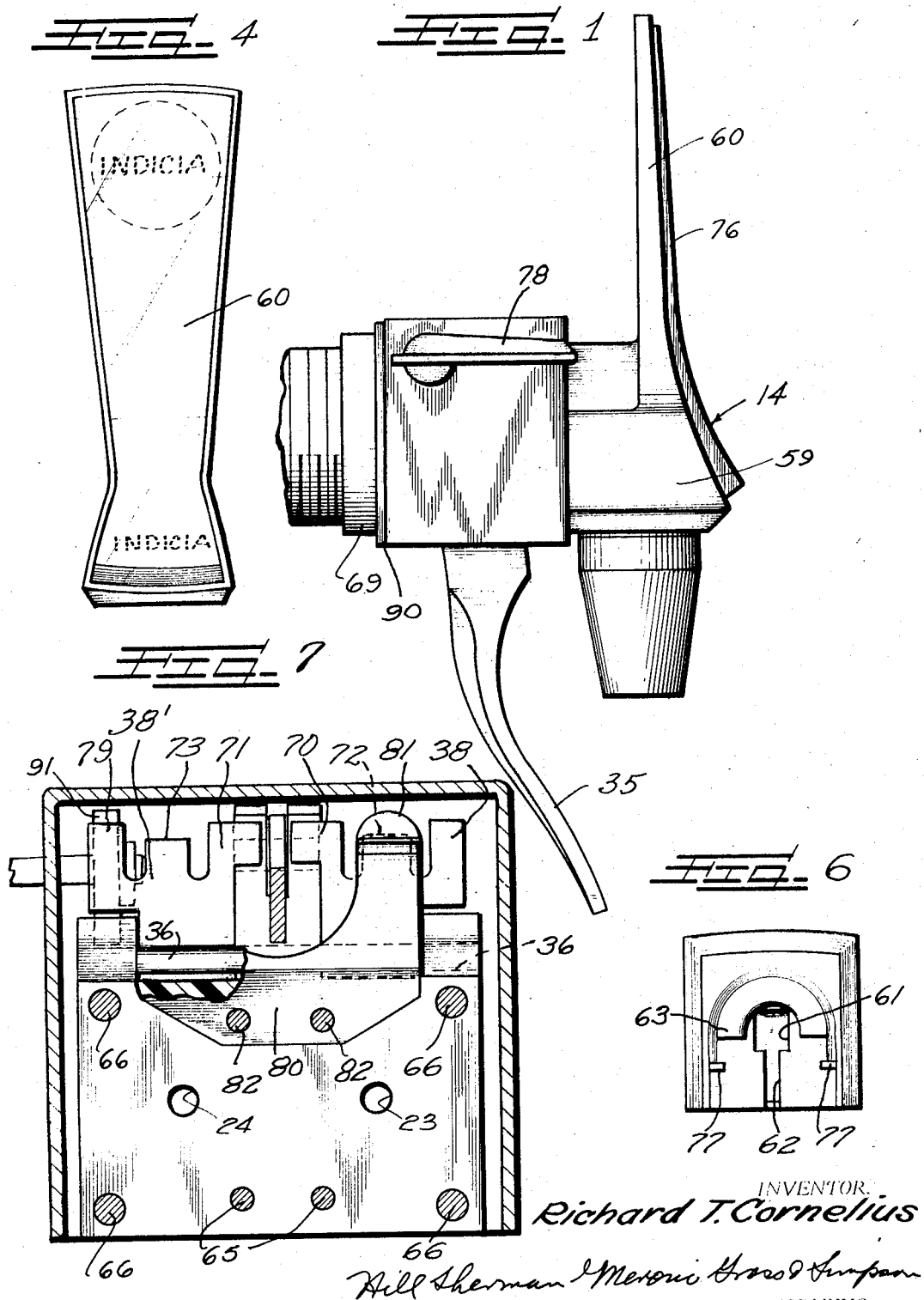

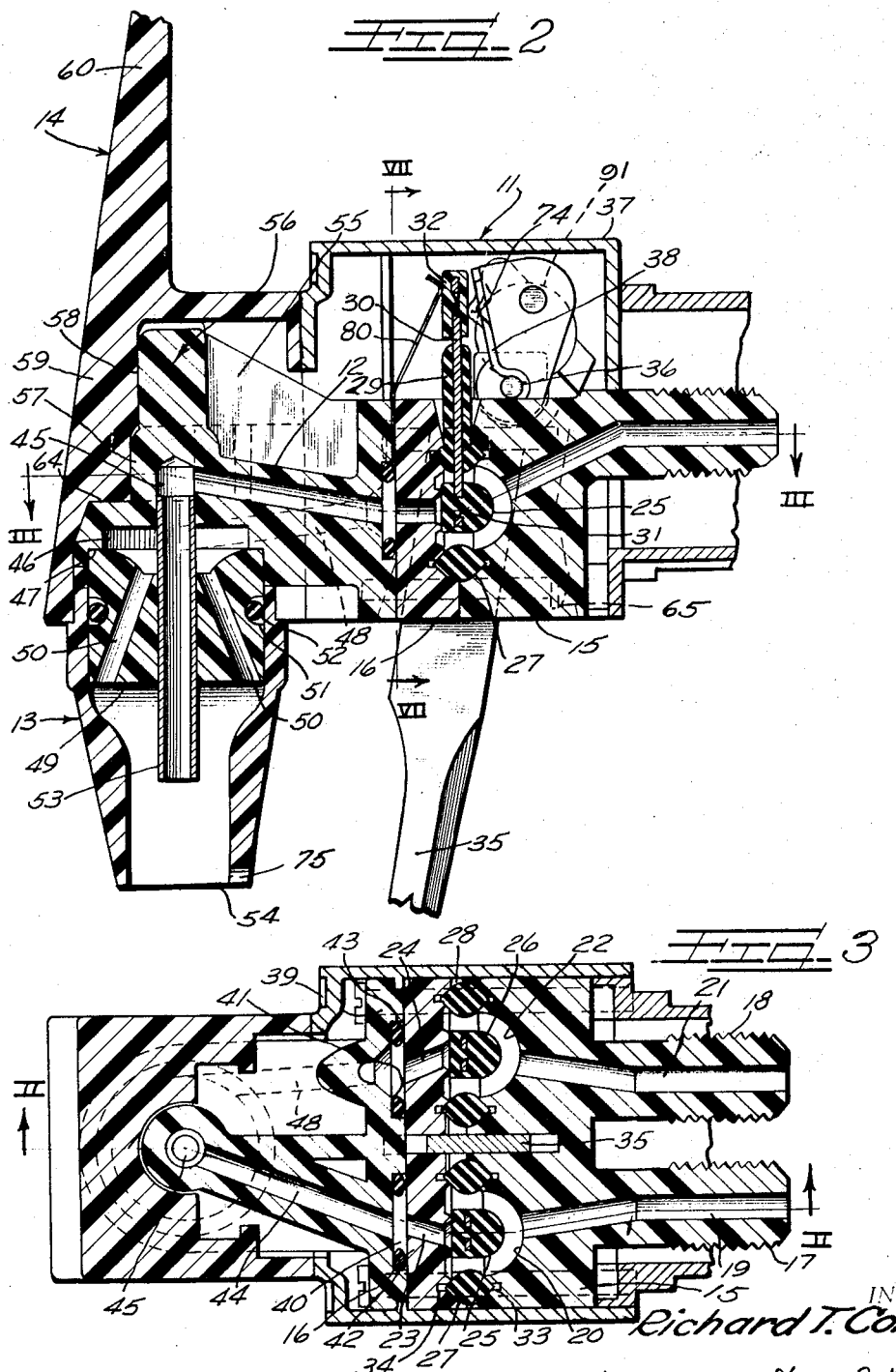

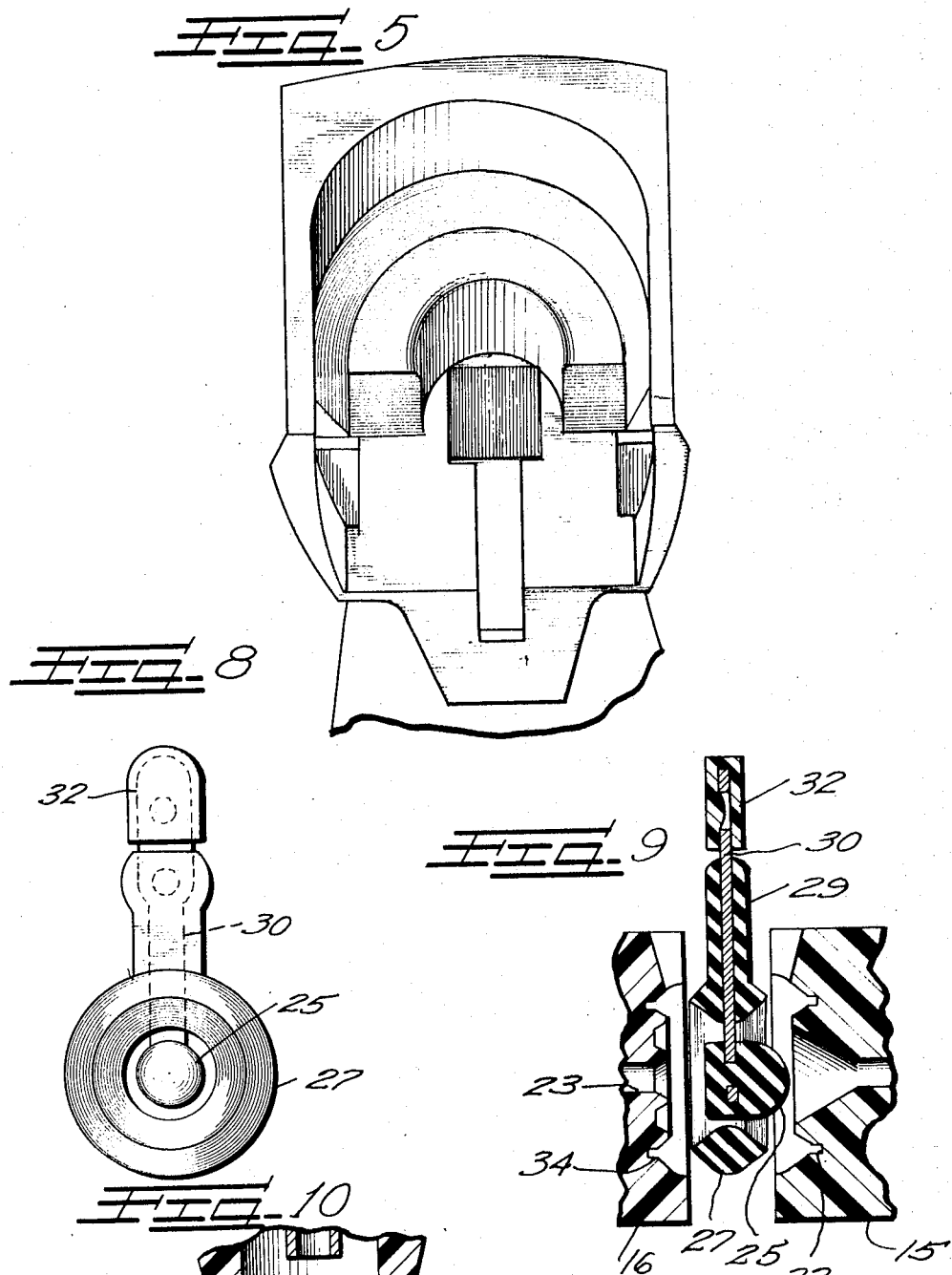

---

3,455,332
POST-MIX VALVE
Richard T. Cornelius, Minneapolis, Minn., assignor to The Cornelius Company, Anoka, Minn., a corporation of Minnesota
Filed Oct. 18, 1965, Ser. No. 497,417
Int. Cl. F16k *11/04, 19/00*
U.S. Cl. 137—604                12 Claims This invention relates to fluid mixing and dispensing apparatus having a detachable decorative shroud.

There are many commonly consumed beverages which are formed immediately prior to consumption by the mixture of a carbonated liquid with a non-carbonated liquid. A typical example of such a drink is the cola type drink which involves the mixing of a cola syrup, which is relatively concentrated and viscous, with carbonated water. It is desirable that apparatus for dispensing such beverages be decorative, be readily cleanable, be free from tendencies to clog or drip and be provided with means for selectively dispensing one only of the two liquids.

It is an object of the present invention to provide a novel fluid mixing and dispensing apparatus having a distinctive structure and design which embodies one or more of the above features.

Another object of the present invention is to provide a novel and distinctive decorative shroud for a post-mix valve assembly.

It is a further object of this invention to provide a novel post-mix valve assembly which is efficient in operation, rugged and reliable in use and relatively economical to manufacture.

Another object of the present invention is to provide a novel post-mix valve assembly for mixing a carbonated liquid with a non-carbonated liquid, whose duct system and valve operating mechanism provide a simple mechanical structure which may be readily disassembled and cleaned.

Another and further object is to provide a novel post-mix valve for mixing carbonated water with a syrup or other concentrate, in which the operator may dispense either the mixture of the two liquids or one only of the two liquids.

The novel features which I believe to be characteristic of my invention are set forth with particularity in the appended claims. My invention itself, however, both as to its manner of construction and method of operation, together with further objects and advantages thereof, may best be understood by reference to the following description, taken in connection with the accompanying drawings in which:

FIGURE 1 is a side elevational view of a post-mix valve assembly embodying the novel features of the present invention including the novel shroud;

FIGURE 2 is a vertical sectional side view thereof as viewed from the opposite side with the mounting post broken away as taken along the line II—II of FIGURE 3;

FIGURE 3 is a generally horizontal sectional view taken along the irregular line III—III of FIGURE 2;

FIGURE 4 is a front view of the ornamental shroud forming a part of the post-mix valve assembly shown in FIGURE 1;

FIGURE 5 is an enlarged isometric view looking upwardly at an angle on the underside of the ornamental shroud;

FIGURE 6 is a bottom view of the ornamental shroud;

FIGURE 7 is a front sectional view taken along the line VII—VII of FIGURE 2;

FIGURE 8 is an enlarged front elevational view of one sealing ring and valve member employed in the post-mix valve assembly;

FIGURE 9 is an enlarged side view partly in section of one sealing ring and valve member with the parts in which it is mounted exploded away and broken away; and FIGURE 10 is a fragmentary sectional view of the lower end of the spout employed in the post-mix valve assembly.

In the preferred embodiment of the present invention illustrated in the various figures of the drawings, the fluid mixing and dispensing apparatus includes a valve portion 11, a delivery duct bracket 12, a mixing chamber and delivery spout 13 and an ornamental shroud 14.

Post-mix valve assemblies are customarily used in places where they are in full view or nearly full view of the public. For this reason, it is obviously advisable to have the unit pleasing in its appearance. Additionally, it is usually desirable to have some sort of identifying indicia thereon to indicate the type of beverage being dispensed as well as to provide an indication of the source of the beverage and/or the manufacturer of the dispensing apparatus. One of the principal difficulties of providing an ornamental structure of this character lies in keeping it sanitary and clean. The very nature of the beverage being dispensed, that is, a viscous, sticky syrup mixed with a carbonated liquid, makes this difficult. Any ornamental portion of the assembly must be of a structural configuration as to enable it to be readily and quickly disassembled and cleaned, and it must also be of a shape as to substantially eliminate accumulation of any sticky substance in small grooves, holes and the like.

The ornamental shroud 14, illustrated in the drawings hereof, provides such a structure. Before describing it in detail, the post-mix valve itself of the preferred embodiment of my post-mix valve assembly will be described in some detail.

The valve portion 11 includes a pair of blocks 15 and 16 which may conveniently be formed of any suitable inexpensive plastic material and which may be secured together in any suitable manner such as by threaded fastening means 65 and 66. The block 15 is provided with a pair of rearwardly extending fittings 17 and 18 which are arranged to be connected respectively to a syrup or other concentrate supply source and to a source of carbonated water. A mounting post 67 having an end plate 68 (FIG. 3) is provided for supporting the entire structure on a mounting wall, cabinet or the like (not shown). The end plate 68 abuts against block 15 and is secured thereto by the threaded fastening means 66 (there being preferably four such means as shown in FIGURE 7). A collar 69 (shown in FIG. 1 and omitted in other views) may also be provided with an integral end plate 90 which forms one wall of the housing shell hereinafter to be described.

Referring again to the block 15, a fluid passageway 19 extends through the fitting 17 and the block 15 to a dome-shape recess 20 formed in the inner face of the block 15. A fluid passageway 21 extends through the fitting 18 and the block 15 to a dome-shape recess 22 also formed on the inner face of the block 15. The block 16 is provided with a pair of ducts 23 and 24 passing therethrough and which open into the dome-shape regions provided by the recesses 20 and 22. The rearward end of these ducts 23 and 24 provide a pair of valve seats against which movable valve members 25 and 26 are arranged to be seated.

As may be seen best in FIGURES 2, 3, 8 and 9, the valves 25 and 26 are formed as an assembled part of a pair of ring seals 27 and 28 which are clamped between the confronting faces of the blocks 15 and 16. It will be noted that the ring seal 27 has an upwardly extending integral arm 29 through which a metal leaf or finger 30 extends. The inner end of the finger 30 extends into the center of the ring 27 and has the valve member 25 molded thereon and through an opening 31 formed in the inner end of the finger. Rocking movement of the finger 30 using the ring seal 27 as a fulcrum point causes movement of the valve member 25. The outer end of the finger 30 has a molded button 32 snapped thereon or otherwise attached thereto for engagement by an actuating arm hereinafter to be described. The ring seal 27 and its associated upwardly extending portion which covers the metal finger 30 as well as the valve member 25 is preferably of rubber or rubber-like material. The outer button 32 is formed of a different material which is more wear resistant and preferably is some form of plastic.

In order to provide a convenient method for quickly aligning the ring seal 27, the ring seal is preferably not a torus having its body portion of circular cross section but rather is a torus whose body portion is given a shape having a relatively sharp peripheral edge on each face. The block 15 has a small circular groove 33 therein while the block 16 has a corresponding small groove 34 therein for receiving these sharp inner and outer peripheral edges of the ring seal member. This enables quick alignment of the ring seal in proper position when the unit is being assembled.

The ring seal 28 and its upstanding arm is similar to the ring seal 27.

As will clearly be understood from an inspection of FIGURES 1, 2 and 9, the two valve members 25 and 26 are preferably flat on their respective faces which are arranged to be seated on the valve seat provided by the rearward ends of the ducts 23 and 24. Their opposite faces, however, are dome or bullet shaped in order to spread the flow of fluid thereover more evenly when the valve is in its open position. This substantially reduces turbulence particularly in the carbonated water inlet which would otherwise cause an undesired amount of decarbonation to occur.

Suitable actuating means is provided for the valves 25 and 26 in the form of a lever 35 which is pivotally mounted as at 36 to the housing 37 which encloses the valve mechanism. The lever 35 extends above its pivotal point 36 in a recess in the blocks 15 and 16 between the two ring seals 27 and 28. Two plates 38 and 38' are carried loosely on the pivot pin 36 and are arranged so that the widened upper end of the actuating arm 35 engages the inner fingers 70 and 71 of each of the plates 38 and 38' to rock the same in a counterclockwise direction (as viewed in FIGURE 2) when the valves are to be opened. Rocking of the two plates 38 and 38' causes the two middle fingers 72 and 73 of the plates 38 and 38' to respectively engage the buttons 32 to rock the upstanding fingers 30 in a counterclockwise direction about the fulcrum points provided by the two sealing rings 27 and 28. This causes a lifting of the valve members 25 and 26 off of their respective valve seats. The middle fingers 72 and 73 preferably have a transverse rib 74 formed therein to reduce the amount of friction caused by the slight sliding of the finger against the cooperating button of the valve actuating arm.

The delivery duct bracket 12 has a rear plate 39 in which two recesses 40 and 41 are formed opposite the front end of the ducts 23 and 24 of the block 16. A pair of O-rings 42 and 43 are disposed in the recesses 40 and 41 to provide suitable sealing in the region where liquid is passing from the block 16 into the ducts of the member 12. The member 12 has a duct 44 leading from the recess 40 to a central downwardly extending opening 45. The forward end of the member 12 has a downwardly facing recess 46 having an intermediate shoulder 47 formed in the wall of the recess. A second duct 48 is formed in the member 12 which leads from the recess 41 to the downwardly opening recess 46. The point of entry of the duct 48 is located tangentially with respect to the circular recess 46 so that as liquid enters the recess 46 from the duct 48, it is given a swirling motion before passing out of the recess 46.

A plug member 49 fits into the recess 46 as far as the shoulder 47. This plug member 49 has a plurality of downwardly diverging ducts 50 therein which are arranged to pass carbonated water from the chamber provided by the recess 46 to the lower end of the plug 49. The plug 49 is provided with a circumferential groove 51 in which a rubber ring 52 is disposed. The spout 13 is arranged to form a tight friction fit over the plug 49 and the rubber ring 52. A delivery tube 53 extends centrally through the plug 49, through the chamber provided by the recess 46 and up into the downwardly formed opening 45 which communicates with the duct 44. The tube 53 is of such length as to extend somewhat past the lower end of the plug 49. The inner wall of the spout 13 is provided with a reverse curvature as shown in FIGURE 2 so that as carbonated water emerges from the ducts 50 its direction is gradually changed and caused to pass down past the lower end of the tube 53. Since syrup or other concentrate is emerging from the tube 53 into the area immediately therebelow through which carbonated water is passing, mixture occurs at this point; that is, just inside of the lower end of the spout 13.

It will be observed from an examination of FIGURES 2 and 10 that the lower edge 54 of the spout 13 has a notch 75 therein. It has been found in practice that this tends to reduce dripping at this point when the valves are again closed.

The delivery duct bracket 12 has an upstanding web 55 which serves to reinforce an upstanding post 56. This web 55 extends from the rear plate 39 to the upstanding post 56 which is circular in cross section in its lower part 57 and rectangular in cross section in its upper part 58. Rear plate 39, web 55 and post 56 are formed integral with the main body of member 12.

Referring now to a consideration of the shroud 14, its configuration will be understood from a consideration of FIGURES 1, 2, 4, 5 and 6. It includes a body portion 59 which nests over the post 56 and the web 55 and is supported by the post 56. Shroud 14 also includes an upstanding bladelike portion 60 which serves as a means for carrying identifying indicia on one or both sides. A transparent plastic overlay 76 preferably covers part or all the side carrying indicia and serves as a protective coating for the indicia.

The shape of the inner part of the body portion 59 is best seen in FIGURES 5 and 6 which are respectively an isometric view of the underside and a bottom view. A generally rectangular recess 61 is provided for receiving post 56 of bracket 12 and a slot 62 is provided for receiving the web 55. A semi-circular shoulder is provided as at 63 to act as a seat for resting the upper surface 64 which lies above chamber 46 in member 12. Webs 77 are also provided to form a further support.

The whole apparatus is such that it may be readily disassembled and cleaned so as to be kept in a sanitary condition. The configuration of the shroud 14 enables it to be firmly attached to the valve and dispensing portion of the assembly and yet it can be very quickly removed by simply lifting it off. Mixing chamber and spout member 13 can be quickly slid off of plug 49. Plug 49 is cemented or bonded in its nested fit with member 12. Blocks 15 and 16 can be quickly separated as can block 16 and member 12.

In operation, fitting 17 is connected to a source of syrup or concentrate while fitting 18 is connected to a source of carbonated water. Both sources are under pressure. Movement of the operating lever 35 in a counterclockwise direction rocks valve arms 30 in a counterclockwise direction to lift valve members 25 and 26 off of their respective seats. Fluid flows smoothly past the valve members 25 and 26 due to their bullet-like noses. The absence of agitation at this point is particularly important in the carbonated water line.

The carbonated water enters the chamber 46 with a swirling but smooth motion and then passes through the ducts 50 into the spout 13 where it again passes over the smooth reverse curvature wall of the upper end of the spout 13. The syrup or concentrate passes down through the tube 53 and mixes with the carbonated water just beyond the point where the reverse curvature of the inner wall ends.

Due to the notch 75 of the spout 13, dripping is greatly reduced when the lever 35 is released.

Biasing means may be provided if desired to normally retain valve members 25 and 26 in their closed positions.

An additional feature of the post-mix valve assembly herein described is the provision of an auxiliary valve actuating lever 78 which can open one of the valves without opening the other. This is readily provided for since the plates 38 and 38' are independent of each other. To this end an outer finger 79 is provided in one or both of the plates 38 and 38'. The lever 78 is mounted for limited rocking movement and carries an inner finger 91 (FIGURE 7) for engaging finger 79. Preferably this is the finger 79 of plate 38' which controls the flow of carbonated liquid. When lever 78 is depressed carbonated liquid only will be discharged from spout 13.

While liquid pressure will tend to keep the valve members closed, it is preferable to have some resilient biasing means which will normally maintain the valve members 25 and 26 in their respective closed positions. This may be conveniently accomplished by the use of a leaf spring plate 80 which has fingers 81 disposed to bear against the valve member arms 30 on the opposite sides thereof from the middle ears 72 and 73 of plates 38 and 38'. The leaf spring plate is secured to block 16 by suitable screws 82.

It will, of course, be appreciated that other specific forms of the invention may be made within the scope of what is claimed without departing from the spirit of the invention.

I claim as my invention:

1. A fluid mixing and dispensing apparatus comprising a valve portion having a pair of ducts passing therethrough, an intermediate body member having a pair of ducts passing therethrough and in fluid communication with said first pair of ducts, said body member being mounted on and secured to said valve portion, a mixing chamber and delivery spout into which said second pair of ducts open, and a shroud having indicia thereon slidably mounted on and supported by said body member, said valve portion including a pair of valve members for controlling the flow of fluid through said first pair of ducts, said body member including an upstanding web and an upstanding post, said shroud including a complementary recess for receiving and nesting said web and post thereby to detachably support said shroud therein.

2. A post-mix valve assembly comprising:
   (a) a valve body having a pair of inlet ducts and a pair of outlet ducts with a pair of ports each connecting an inlet duct with an outlet duct,
   (b) valve members movably mounted to open and close said ports,
   (c) a delivery spout and mixing chamber member detachably secured to said valve body and in open fluid communication with said outlet ducts,
   (d) an actuating lever depending from said valve body and positioned to open said valve members simultaneously upon movement thereon,
   (e) and a second actuating lever mounted on said valve body and positioned to open only one of said valve members.

3. A post-mix valve assembly comprising:
   (a) a valve body having a pair of inlet ducts and a pair of outlet ducts with a pair of ports each connecting an inlet duct with an outlet duct,
   (b) valve members movably mounted to open and close said ports,
   (c) said valve members each having an upstanding arm, a pintle disposed adjacent said arms, a pair of plates rockably mounted on said pintle, one of said plates including at least three upstanding ears and the other of said plates including at least two upstanding ears, one ear of each of said plates being disposed against respective valve member arms,
   (d) an actuating lever pivotally mounted on said valve body and having a portion thereof engaging a different set of ears of said plates and positioned to move said arms to valve opening position upon movement of said lever,
   (e) a second actuating lever pivotally mounted on said valve body and having a portion thereof positioned to engage the third ear of one of said plates, whereby said last mentioned plate may move one of said valve arms to valve opening position without moving the other,
   (f) and means resiliently biasing said valve member arms to their respective valve closing positions.

4. A dispensing valve assembly comprising:
   (a) a valve body having inlet and outlet ducts;
   (b) a delivery spout member in fluid communication with said outlet duct; and
   (c) a one-piece shroud having an upstanding blade and having means defining a downwardly opening recess shaped to slidably receive and to substantially encircle a portion of said valve body; and
   (d) means on said shroud and said valve body slidably inter-locking with each other for resisting rocking of said shroud in response to any force applied to said blade.

5. A liquid mixing and dispensing apparatus comprising:
   (a) a valve body having a pair of fluid inlet ducts;
   (b) a pair of fluid inlet chambers having substantially hemispherical concave surfaces into which said inlet ducts open;
   (c) an intermediate body member separate from said body and having a pair of ducts therein and having a face forming a wall for each of said inlet chambers;
   (d) said intermediate body member ducts opening out at one end in said wall to provide a pair of valve seats in said chambers;
   (e) a pair of valve members respectively movably mounted in said chambers for seating on said valve seats, said valve members having a convex upstream nose shaped substantially as a hemisphere;
   (f) a mixing chamber into which the other ends of said intermediate body member ducts open;
   (g) a discharge nozzle opening from said mixing chamber; and
   (h) means for opening and closing said valve members.

6. A liquid dispensing valve assembly comprising:
   (a) a pair of blocks having confronting faces detachably secured together and in engagement with each other;
       (1) at least one of said faces being recessed to provide a valve chamber,
       (2) one of said blocks having an inlet duct passing therethrough into said chamber,
       (3) the other of said blocks having a discharge duct passing therethrough and opening at one end into said chamber,
       (4) the chamber end of said discharge duct providing a valve seat;
   (b) a sealing ring having a free non-circular cross-sectional shape clamped in a groove of complemental shape and fixed size in said blocks and in spaced relation around said valve seat and providing a fluid seal between said blocks, the effective size of said cross-sectional shapes being substantially equal, whereby said blocks retain said clamped ring with its clamped cross-sectional shape like its free shape;

(c) an actuating arm formed integral with said ring, which lies in the plane of said ring and which extends radially inwardly of said ring to a point opposite said valve seat;

(d) a valve member separate from said ring carried by said inner end of said arm and positioned to be moved into valve closing position against said valve seat; and (e) said arm also extending radially outwardly of said ring beyond the outer periphery of said blocks, whereby said ring provides a fulcrum for rocking movement of said arm to move said valve member to opened and closed positions.

7. A dispensing valve assembly comprising a valve portion having an inlet duct passing therethrough, an intermediate body member having an outlet duct passing therethrough and in fluid communication with said inlet duct, said body member being mounted on and secured to said valve portion, a delivery spout member into which said outlet duct opens, and a shroud having indicia thereon and slidably mounted on and supported by said body member, said valve portion including a valve member for controlling the flow of fluid through said inlet duct, said body member including an upstanding web and an upstanding post, said shroud including a complementary recess for receiving and nesting with said web and post thereby to detachably support said shroud thereon.

8. A dispensing valve assembly comprising:
(a) a valve body having inlet and outlet ducts and having a portion including said outlet duct and provided with an upstanding post;
(b) a delivery spout member in fluid communication with said outlet duct; and
(c) an ornamental shroud having a body portion for housing said portion of said valve body including said outlet duct and also having an upstanding ornamental blade;
(d) said shroud body portion being shaped to slidably nest over and fit snugly with said portion of said valve body and having means defining a mating recess shaped to substantially encircle and engage said post.

9. A dispensing valve assembly comprising:
(a) a valve body having inlet and outlet ducts and having a portion including said outlet duct provided with an upstanding post and an upstanding web integral with and bracing said post;
(b) a delivery spout member in fluid communication with said outlet duct; and
(c) an ornamental shroud having a body portion for housing said portion of said valve body including said outlet duct and also having an upstanding ornamental blade;
(d) said shroud body portion being shaped to slidably nest over and fit snugly with said portion of said valve body and having means defining a mating recess shaped to substantially encircle and engage said post.

10. A dispensing valve assembly comprising:
(a) a valve body having inlet and outlet ducts and having a portion including said outlet duct and including a generally horizontal ledge with an upstanding post and an upstanding web integral with said post rising from said ledge;
(b) a delivery spout member in fluid communication with said outlet duct and depending from said generally horizontal ledge; and
(c) an ornamental shroud having a body portion for housing said portion of said valve body including said outlet duct and also having an upstanding ornamental blade;
(d) said shroud body portion being shaped to slidably nest over and fit snugly with said portion of said valve body and having means defining a mating recess shaped to substantially encircle and engage said post, and having a partial shelf adjacent said recess and shaped to seat on said ledge when said recess receives said post.

11. A dispensing valve assembly comprising:
(a) a valve body having inlet and outlet ducts and having a portion including said outlet duct and including a generally horizontal ledge with an upstanding post and an upstanding web integral with said post rising from said ledge;
(b) a delivery spout member in fluid communication with said outlet duct and depending from said generally horizontal ledge; and
(c) an ornamental shroud having a body portion for housing said portion of said valve body including said outlet duct and also having an upstanding ornamental blade;
(d) said shroud body portion being shaped to slidably nest over and fit snugly with said portion of said valve body, having means defining a mating recess shaped to substantially encircle and engage said post, and having a partial shelf adjacent said recess and shaped to seat on said ledge when said recess receives said post, the inner wall of said shroud body portion below said shelf being shaped to fit snugly around the end of said horizontal ledge.

12. A dispensing valve assembly comprising:
(a) a valve body having inlet and outlet ducts and having a portion including said outlet duct and including a generally horizontal ledge from which a post and a web rise;
(b) a delivery spout member in fluid communication with said outlet duct and depending from said generally horizontal ledge, said spout member being slidably detachable from said ledge; and
(c) an ornamental shroud having a body portion for housing said portion of said valve body including said outlet duct and also having an upstanding ornamental blade;
(d) said shroud body portion being shaped to slidably nest over and fit snugly with said portion of said valve body, having means defining a mating recess shaped to substantially encircle and engage said post, and having a partial shelf adjacent said recess and shaped to seat on said ledge when said recess receives said post, the inner wall of said shroud body portion below said shelf being shaped to fit snugly around the end of said generally horizontal ledge.

References Cited

UNITED STATES PATENTS

| | | | |
|---|---|---|---|
| 2,057,745 | 10/1936 | Scheyer et al. | |
| 2,645,246 | 7/1953 | Segal | 137—607 X |
| 2,653,055 | 9/1953 | Welty et al. | 239—445 X |
| 2,767,737 | 10/1956 | Turak | 251—367 X |
| 2,823,833 | 2/1958 | Bauerlein | 137—604 X |
| 2,861,591 | 11/1958 | Hertel | 137—607 |
| 2,940,483 | 6/1960 | Mossberg | 137—607 X |
| 3,102,712 | 9/1963 | Zilk | 251—298 |
| 3,167,090 | 1/1965 | Booth et al. | 137—607 X |

WILLIAM F. O'DEA, Primary Examiner

D. H. LAMBERT, Assistant Examiner

U.S. Cl. X.R.

137—381, 607; 222—145; 239—445, 600; 251—367